(12) United States Patent
Dane et al.

(10) Patent No.: US 10,167,825 B1
(45) Date of Patent: Jan. 1, 2019

(54) AIR INTAKE ASSEMBLY FOR MOTORCYCLE

(71) Applicant: Harley-Davidson Motor Company Group, LLC, Milwaukee, WI (US)

(72) Inventors: Mark Dane, Eagle, WI (US); Bob Iverson, Milwaukee, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 0 days.

(21) Appl. No.: 15/711,025

(22) Filed: Sep. 21, 2017

(51) Int. Cl.
| | |
|---|---|
| *F02M 35/04* | (2006.01) |
| *F02M 35/024* | (2006.01) |
| *F02M 35/02* | (2006.01) |
| *F02M 35/16* | (2006.01) |
| *F02M 35/10* | (2006.01) |

(52) U.S. Cl.
CPC ...... *F02M 35/048* (2013.01); *F02M 35/0204* (2013.01); *F02M 35/0212* (2013.01); *F02M 35/02433* (2013.01); *F02M 35/10262* (2013.01); *F02M 35/162* (2013.01)

(58) Field of Classification Search
CPC .. F02M 35/04; F02M 35/048; F02M 35/0204; F02M 35/0212; F02M 35/02433; F02M 35/10262; F02M 35/162
See application file for complete search history.

(56) References Cited

U.S. PATENT DOCUMENTS

| | | | | |
|---|---|---|---|---|
| 3,859,965 | A * | 1/1975 | Hatz | F01P 1/02 |
| | | | | 123/41.62 |
| 4,039,308 | A | 8/1977 | Schiff | |
| 4,222,755 | A * | 9/1980 | Grotto | B01D 46/26 |
| | | | | 55/291 |
| 5,900,595 | A * | 5/1999 | Akima | F02M 35/14 |
| | | | | 181/229 |
| 6,824,583 | B2 | 11/2004 | Bulger | |
| 6,955,699 | B2 | 10/2005 | Bergami | |
| 7,357,205 | B2 | 4/2008 | Nishizawa | |
| 7,412,960 | B2 | 8/2008 | Nishizawa | |
| 8,152,880 | B2 | 4/2012 | Matschl et al. | |
| 8,887,685 | B2 | 11/2014 | Beck | |

(Continued)

FOREIGN PATENT DOCUMENTS

| | | |
|---|---|---|
| DE | 10205754 | 8/2003 |
| EP | 2949564 | 2/2015 |

(Continued)

*Primary Examiner* — Hieu T Vo
(74) *Attorney, Agent, or Firm* — Michael Best & Friedrich LLP (57) ABSTRACT

An air intake assembly includes a filter element and an intake conduit. The intake conduit includes a first end forming an inlet opening. The first end supports the filter element. The intake conduit also includes a second end forming an outlet opening and being adapted for attachment to an internal combustion engine. The intake conduit further includes a body defining a central axis extending between the first and second ends. A first lateral dimension of the body is taken transverse to the central axis, adjacent the inlet opening, within a plane that intersects both the inlet and outlet openings. A second lateral dimension of the body is taken transverse to the central axis, adjacent the outlet opening, within the plane. The first lateral dimension is less than the second lateral dimension.

20 Claims, 7 Drawing Sheets

(56) References Cited

U.S. PATENT DOCUMENTS

| | | |
|---|---|---|
| 9,046,065 B2 | 6/2015 | Chang et al. |
| 9,303,602 B2 * | 4/2016 | Kinpara ............. F02M 35/1272 |
| 2008/0041328 A1 | 2/2008 | Granatelli |
| 2016/0129383 A1 | 5/2016 | Volk et al. |

FOREIGN PATENT DOCUMENTS

| | | | |
|---|---|---|---|
| JP | H10238425 | 9/1998 | |
| WO | WO 2016166688 A1 * | 10/2016 | ....... F02M 35/10262 |

* cited by examiner

AIR INTAKE ASSEMBLY FOR MOTORCYCLE

FIELD OF THE DISCLOSURE

The present disclosure relates to motorcycles, and more particularly to an air intake assembly for a motorcycle.

BACKGROUND

Conventional high-flow air intake assemblies for motorcycles may include a tubular conduit supporting an exposed cone filter. The tubular conduit extends from a side of a motorcycle and toward a rider's leg once the rider is positioned on the motorcycle. Such air intake assemblies may extend from the side of the motorcycle so as to interfere with a comfortable riding position for some riders.

SUMMARY

In one aspect, an air intake assembly includes a filter element and an intake conduit. The intake conduit includes a first end forming an inlet opening. The first end supports the filter element. The intake conduit also includes a second end forming an outlet opening and being adapted for attachment to an internal combustion engine. The intake conduit further includes a body defining a central axis extending between the first and second ends. A first lateral dimension of the body is taken transverse to the central axis, adjacent the inlet opening, within a plane that intersects both the inlet and outlet openings. A second lateral dimension of the body is taken transverse to the central axis, adjacent the outlet opening, within the plane. The first lateral dimension is less than the second lateral dimension.

In another aspect, an air intake assembly includes an intake conduit defining a curved flow path and an air filter subassembly having a base end adapted to fit onto the intake conduit. The air filter subassembly includes a first filter element having a front end and a rear end and a velocity stack coupled to the rear end of the first filter element to inhibit relative movement between the velocity stack and the first filter element. The velocity stack includes an interior surface having an inlet opening and an outlet opening. The interior surface tapers from the inlet opening to the outlet opening.

In yet another aspect, a motorcycle includes an air intake assembly having a filter element and an intake conduit. The intake conduit includes a first end forming an inlet opening. The first end supports the filter element. The intake conduit also includes a second end forming an outlet opening and being adapted for attachment to an internal combustion engine. The intake conduit further includes a body defining a central axis extending between the first and second ends. A first lateral dimension of the body is taken transverse to the central axis, adjacent the inlet opening, within a plane that intersects both the inlet and outlet openings. A second lateral dimension of the body is taken transverse to the central axis, adjacent the outlet opening, within the plane. The first lateral dimension is less than the second lateral dimension.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
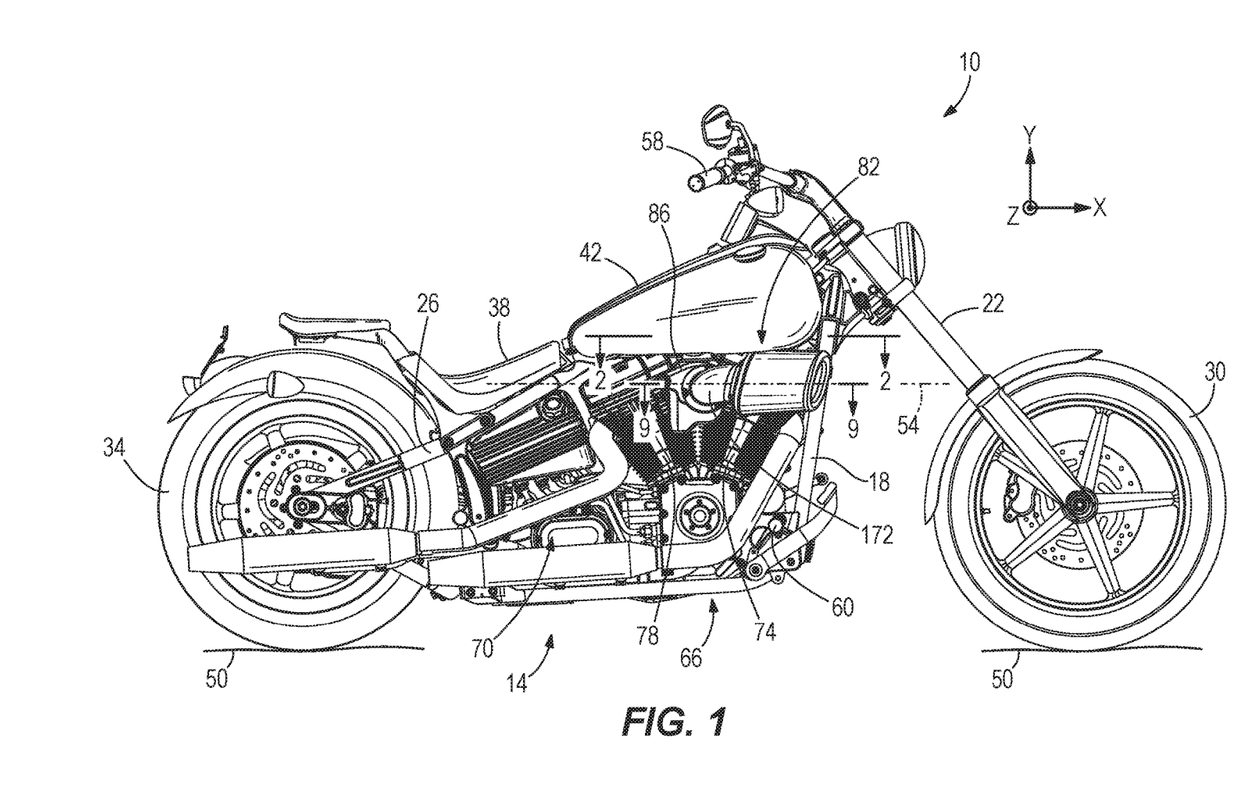
FIG. 1 is a side view of a motorcycle including an air intake assembly according to an embodiment of the disclosure.
Figure 2:
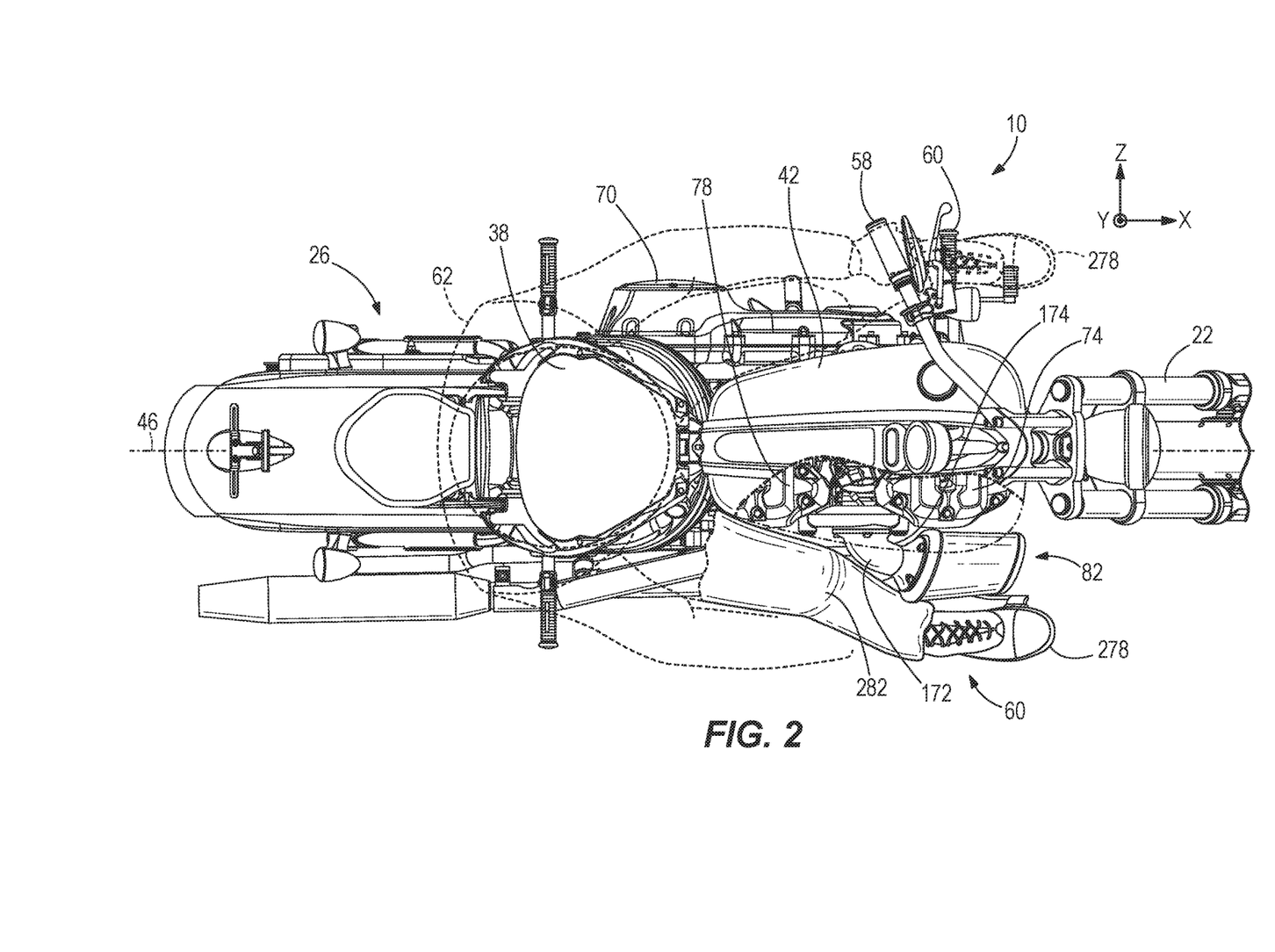
FIG. 2 is a top view of the motorcycle of FIG. 1 with a portion of the motorcycle in cross-section taken along 2-2 of FIG. 1 illustrating a rider's leg positioned adjacent the air intake assembly.

FIG. 1 illustrates a motorcycle 10 including a drive assembly 14, a frame 18, a front fork assembly 22, a swing arm or rear fork assembly 26, a front wheel 30, a rear wheel 34, a seat 38, and a fuel tank 42. The motorcycle 10 defines a longitudinal or vertical plane 46 (e.g., parallel to a XY plane as best shown in FIGS. 1 and 2) extending between the front and rear wheels 30, 34 and oriented substantially perpendicular to ground 50 that supports the motorcycle 10 when the motorcycle 10 is in an upright position as illustrated in FIG. 1. The motorcycle 10 also defines a lateral or horizontal plane 54 (e.g., parallel to a XZ plane as best shown in FIG. 1) that intersects an air intake assembly 82 coupled to the motorcycle 10, as discussed in more detail below. In some embodiments, the horizontal plane 54 is oriented substantially parallel to the ground 50 when the motorcycle 10 is in the upright position.

The front fork assembly 22 is pivotally coupled to the frame 18 at a front end of the motorcycle 10 and rotatably supports the front wheel 30. The front fork assembly 22 includes a pair of handle bars 58 (only one handle bar 58 is shown in FIGS. 1 and 2) for steering the motorcycle 10. The rear fork assembly 26 is coupled to the frame 18 at a rear end of the motorcycle 10 and rotatably supports the rear wheel 34. The seat 38 and footrests 60 (e.g., foot pegs) are coupled to the frame 18 to support a rider 62 positioned on the motorcycle 10 (FIG. 2). The fuel tank 42 is also coupled to the frame 18 and provides fuel to the drive assembly 14.

With continued reference to FIG. 1, the drive assembly 14 is coupled to the frame 18 beneath the seat 38 between the front wheel 30 and the rear wheel 34 of the motorcycle 10. The drive assembly 14 includes an internal combination engine 66 and a transmission 70. The engine 66 is a V-twin engine including a first or front cylinder block 74 and a second or rear cylinder block 78. The engine 66 is operable to drive the rear wheel 34 via the transmission 70, for example at a plurality of different selectable speed ratios, in order to move the motorcycle 10 relative to the ground 50.

Figure 3:
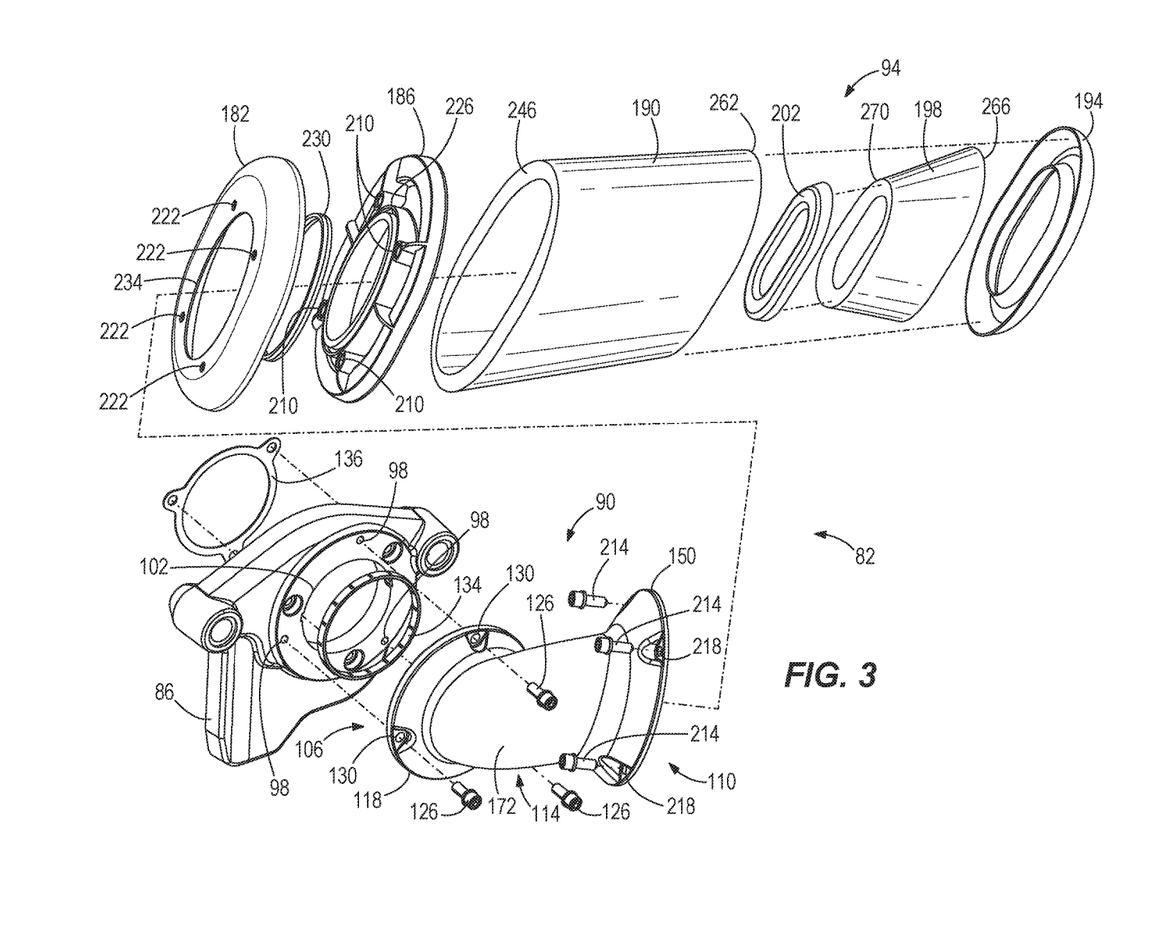
FIG. 3 is an exploded view of the air intake assembly of FIG. 1.

An air intake assembly 82 is also illustrated in FIG. 1 that is selectively attached to the engine 66 with the horizontal plane 54 intersecting the air intake assembly 82 (e.g., at section line 8-8). Particularly, the air intake assembly 82 mounts to a lateral side of the engine 66. With reference to FIGS. 2 and 3, the air intake assembly 82 includes a bracket 86, a conduit 90 generally shaped as an oblique elbow, and an air filter subassembly 94. The bracket 86 is mountable to the engine 66 (FIGS. 1 and 2) via, for example, by two bolts and includes threaded bracket apertures 98 positioned around an engine air inlet port 102 of the bracket 86. The bracket 86 can establish fluid communication for the air intake assembly 82 to a throttle body inlet (not shown) to provide throttled air for combustion in the engine 66.

As best shown in FIG. 3, the conduit 90 includes an outlet or first end 106 that interfaces with the bracket 86, an inlet or second end 110 that interfaces with the air filter subassembly 94, and a body 114 that extends between the outlet 106 and the inlet 110. The illustrated outlet 106 includes an outlet flange 118 having a planar outlet flange surface 122 (FIG. 4) that abuts the bracket 86. In the illustrated embodiment, the planar outlet flange surface 122 is substantially parallel to the vertical plane 46 of the motorcycle 10. The outlet flange 118—and ultimately the conduit 90—is fixed to the bracket 86 by bracket fasteners 126 (e.g., bolts; FIG. 3) extending through outlet flange apertures 130 of the outlet 106 to engage the threaded bracket apertures 98. In some embodiments, the conduit 90 can be manufactured from carbon fiber, aluminum, or the like. In addition, a first bracket gasket 134 is positioned between the bracket 86 and the planar outlet flange surface 122 to provide an air-seal between the bracket 86 and the conduit 90, and a second bracket gasket 136 is positioned downstream of the bracket 86 to provide an air-seal between the bracket 86 and the engine 66.

Figure 4:
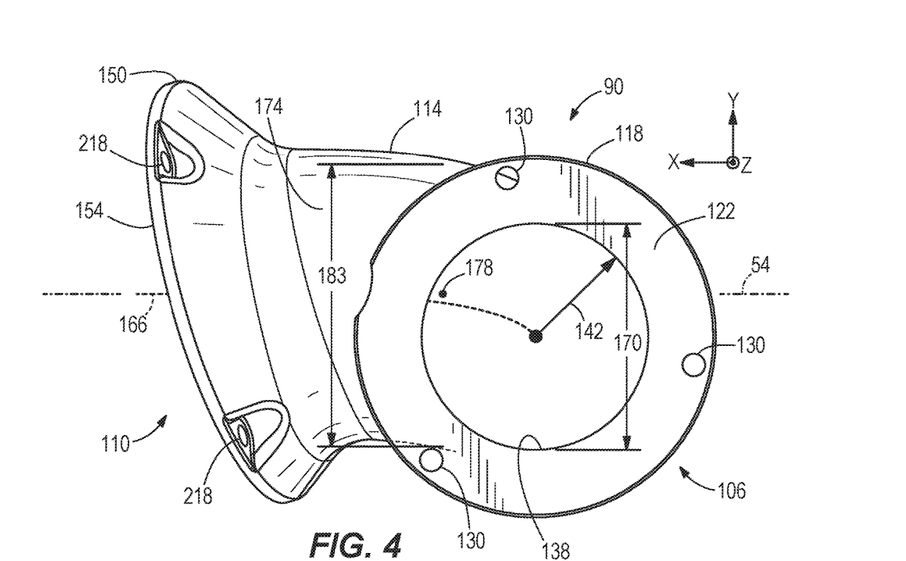
FIG. 4 is an outlet end view of a conduit of the air intake assembly of FIG. 1.

With reference to FIG. 4, the outlet 106 also includes an outlet opening 138. In the illustrated embodiment, the outlet opening 138 is circular-shaped and includes an outlet radius 142 of about 1.30 inches, which matches the geometry of the engine air inlet port 102 of the bracket 86. As such, the area of the outlet opening 138 is about 5.33 inches squared. In other embodiments, the outlet radius 142 can be more or less than 1.30 inches, which will increase or decrease the area of the outlet opening 138, respectively. In further embodiments, the outlet opening 138 can be of different geometry (e.g., ellipse, square, rectangular, triangular, etc.).

Figure 5:
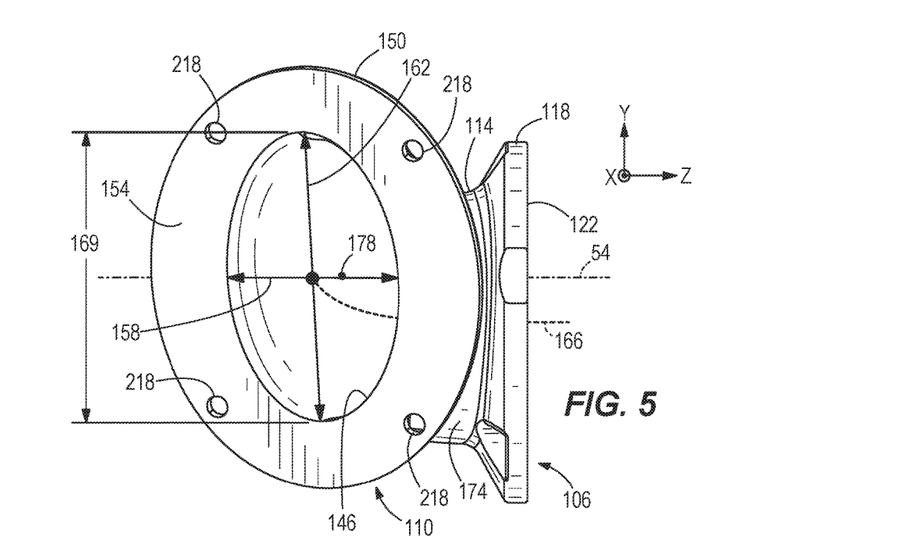
FIG. 5 is an inlet end view of the conduit of FIG. 3.

With reference to FIG. 5, the inlet 110 includes an inlet opening 146 and an inlet flange 150 having a planar inlet flange surface 154 surrounding the inlet opening 146. The illustrated planar inlet flange surface 154 is obliquely oriented relative to the planar outlet flange surface 122. In other words, the planar inlet flange surface 154 is oriented at an oblique angle relative to the vertical and horizontal planes 46, 54. In other embodiments, the planar inlet flange surface 154 can be oriented perpendicular to the planar outlet flange surface 122. In the illustrated embodiment, the inlet opening 146 is non-circular (e.g., ellipse-shaped) and includes a minor diameter or dimension 158 of about 2.43 inches and a major diameter or dimension 162 of about 3.53 inches. As such, the area of the inlet opening 146 is about 6.73 inches squared. In the illustrated embodiment, a ratio of the area of the inlet opening 146 over the area of the outlet opening 138 is about 1.26. In some embodiments, the area of the inlet opening 146 is plus or minus 20 percent of the area of the outlet opening 138, and can be equal to the area of the outlet opening 138 in some constructions. In other embodiments, the area of the inlet opening 146 may vary from the area of the outlet opening 138 by more than 20 percent, for example, by increasing or decreasing at least one of the minor dimension 158 and the major dimension 162 compared to the illustrated embodiment. In the illustrated embodiment, the minor dimension 158 is a horizontal dimension of the inlet opening 146, and the major dimension 162 is a vertical dimension of the inlet opening 146. In particular, the minor dimension 158 is oriented relative to the horizontal plane 54 at an angle less than about 6 degrees, and the major dimension 162 is oriented relative to the vertical plane 46 at an angle less than about 16 degrees (FIG. 5). In other embodiments, the minor dimension 158 can be perpendicular to the planar outlet flange surface 122 (e.g., parallel to the horizontal plane 54), and the major dimension 162 can be parallel to the planar outlet flange surface 122 (e.g., parallel to the vertical plane 46).

Figure 9:
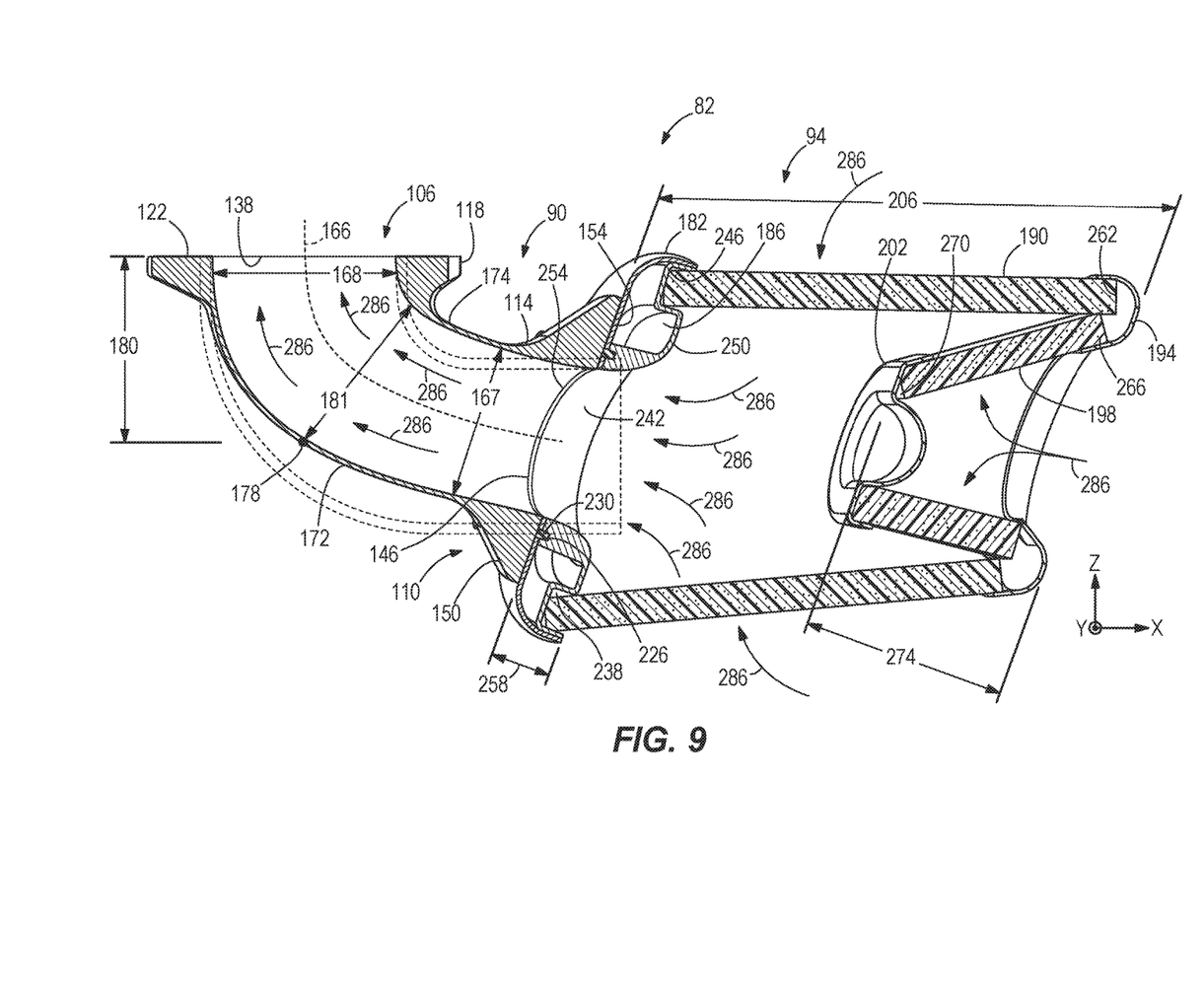
FIG. 9 is a cross-sectional view of the air intake assembly taken along 9-9 of FIG. 1.

With reference to FIGS. 4, 5, and 9, the body 114 is curved and defines a central axis 166 extending between center points of the inlet 110 and the outlet 106. The central axis 166 can be a 2-dimensional or 3-dimensional curve, and can have a constant curvature or different portions with different curvatures, including linear portions. In the illustrated embodiment, the sharpest bend in the central axis 166, defined by the smallest radius, is positioned adjacent the outlet 106 or at least closer to the outlet 106 than the inlet 110 (FIG. 9). However, no portion of the central axis 166 includes a bend greater than 90 degrees so that the central axis 166 does not include any sharp bends or curves between the inlet 110 and the outlet 106.

With continued reference to FIGS. 4, 5, and 9, when the conduit 90 is arranged so that the lateral plane 54 intersects both the inlet opening 146 (i.e., the center point of the inlet opening 146 as illustrated in FIG. 9) and the outlet opening 138, a first lateral dimension 167 of the body 114 is defined in the lateral plane 54, transverse to the central axis 166, in a portion of the body 114 adjacent the inlet 110 (FIG. 9). Likewise, a second lateral dimension 168 of the body 114 is defined in the lateral plane 54, transverse to the central axis 166, in another portion of the body that is adjacent the outlet 106 (FIG. 9). Furthermore, the body 114 includes a first height dimension 169 (FIG. 5) that is transverse to the lateral plane 54 and the central axis 166 at an axial location of the first lateral dimension 167. The body 114 also includes a second height dimension 170 (FIG. 4) that is transverse to the lateral plane 54 and the central axis 166 at an axial location of the second lateral dimension 168. Because the inlet opening 146 is ellipse-shaped and the outlet opening 138 is circular-shaped, the first lateral dimension 167 is less than the second lateral dimension 168 and the first height dimension 169 is greater than the second height dimension 170 (e.g., the body 114 is an ellipse-shaped body adjacent the inlet opening 146 and transitions into a circular-shaped body adjacent the outlet opening 138). In the illustrated embodiment, the inlet opening 146 includes a first shape (e.g., ellipse-shaped), the outlet opening 138 includes a second shape (e.g., circular-shaped), and a portion of the body 114 between the inlet opening 146 and the outlet opening 138 has a different shape (e.g., ellipse-shaped) than the second shape of the outlet opening 138. In other embodiments, the inlet opening 146 and the outlet opening 138 can be the same shape (e.g., circular-shaped) with a portion of the body 114 between the inlet opening 146 and the outlet opening 138 being of a different shape (e.g., ellipse-shaped).

With continued reference to FIG. 9, the illustrated body 114 includes an outer surface 172 that defines an outside portion of the body 114 as the body 114 bends in the horizontal plane 54 away from the outlet 106 and toward the inlet 110 (e.g., the body 114 bends toward a front of the motorcycle 10). The body 114 also includes an inner surface 174 that defines an inside portion of the body 114 as the body 114 bends in the horizontal plane 54. Accordingly, the inner surface 174 generally faces toward the engine 66 and the outer surface 172 generally faces away from the engine 66. In the illustrated embodiment, the outer surface 172 includes an apex or midpoint 178 within the horizontal plane 54 between the inlet 110 and the outlet 106. The illustrated apex 178 is positioned at a distance 180 of less than 2.90 inches from the planar outlet flange surface 122 of the outlet 106 in a direction perpendicular to the planar outlet flange surface 122 (FIG. 9). In other embodiments, the distance 180 can be less than 2.50 inches or less than 2.00 inches. For example, the distance 180 can be about 1.90 inches. Furthermore, when the conduit 90 is arranged so that the lateral plane 54 intersects both the inlet opening 146 and the outlet opening 138 (FIG. 9), a third lateral dimension 181 of the body 114 is defined in the lateral plane 54, transverse to the central axis 166 and intersects the apex 178 (FIG. 9). The body 114 also includes a third height dimension 183 (FIG. 4) that is transverse to the lateral plane 54 and the central axis 166 at an axial location of the third lateral dimension 181. The third lateral dimension 181 is less than the second lateral dimension 168 and the third height dimension 183 is greater than the second height dimension 170.

Figures 6, 7:
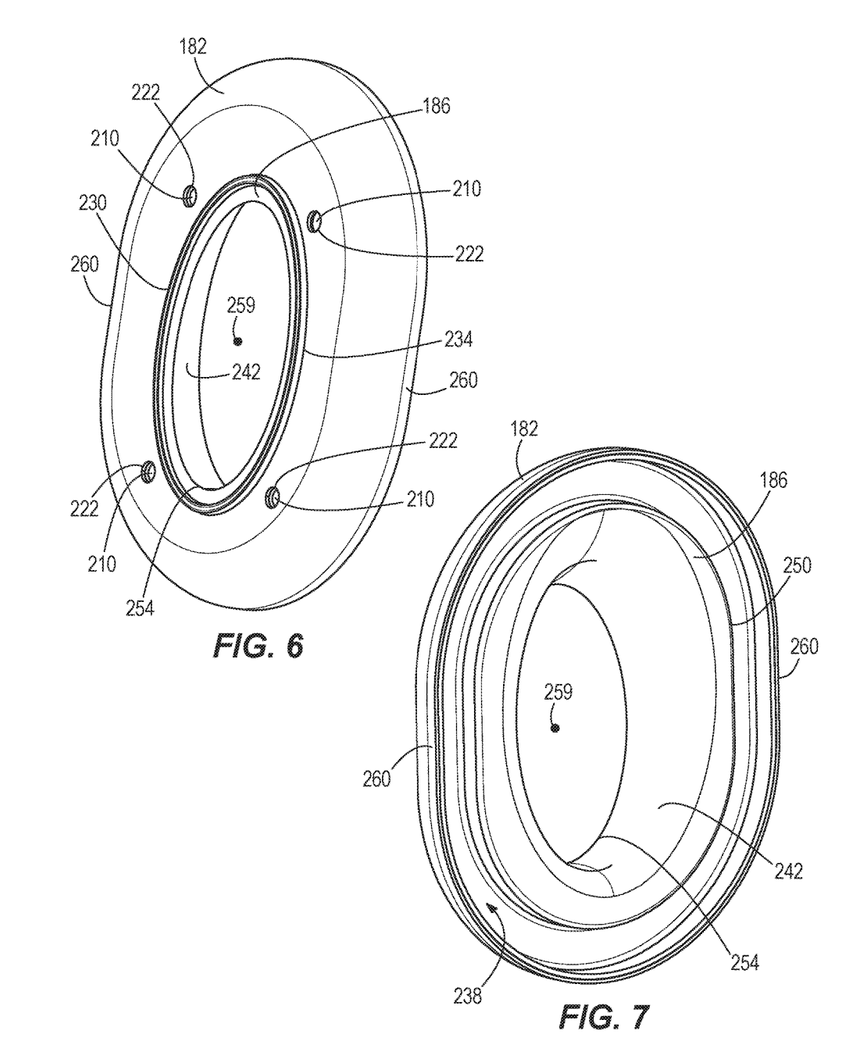
FIG. 6 is a perspective view of an outlet end of a velocity stack subassembly of the air intake assembly of FIG. 3.
FIG. 7 is a perspective view of an inlet end of the velocity stack subassembly of FIG. 6.

With reference to FIG. 3, the air filter subassembly 94 includes a rear end cap 182, a velocity stack 186, a first filter element 190, a front end collar 194, a second filter element 198, and an air-impermeable cap 202. In the illustrated embodiment, a total length 206 of the air filter subassembly 94 between the rear end cap 182 and the front end collar 194 is about 6.35 inches (FIG. 9). The illustrated velocity stack 186 serves as a base or mount of the first filter element 190 for coupling the air filter subassembly 94 to the body 114. In particular, the velocity stack 186 includes threaded velocity stack apertures 210 (e.g., four threaded velocity stack apertures 210). The velocity stack 186 and the rear end cap 182—and ultimately the air filter subassembly 94—is selectively coupled to the conduit 90 by air filter subassembly fasteners 214 (e.g., bolts; FIG. 3) extending through inlet flange apertures 218 of the inlet flange 150 and rear end cap apertures 222 of the rear end cap 182 to engage the threaded velocity stack apertures 210. As described above, the planar inlet flange surface 154 is oriented at an oblique angle relative to the vertical and horizontal planes 46, 54, which also orients the velocity stack 186 at the same oblique angle relative to the vertical and horizontal planes 46, 54. The velocity stack 186 also includes an ellipse-shaped groove 226 that receives an air filter subassembly gasket 230. With reference to FIG. 6, the air filter subassembly gasket 230 and a portion of the velocity stack 186 extend through a central opening 234 of the rear end cap 182 so that the velocity stack 186, the air filter subassembly gasket 230, and the rear end cap 182 abut the inlet flange 150 of the conduit 90 to provide an air-seal between the conduit 90 and the air filter subassembly 94 (e.g., the air filter subassembly gasket 230 is compressed between the velocity stack 186 and the conduit 90 by tightening the fasteners 214; FIG. 9). In particular, the air filter subassembly gasket 230 is compressed in an axial direction parallel to a longitudinal axis of each fastener 214. In other embodiments, the air filter subassembly gasket 230 can be formed as a rubber overmold on at least one of the rear end cap 182 and the velocity stack 186. In further embodiments, the rear end cap 182 and the velocity stack 186 can be formed as a single component. In some embodiments, the rear end cap 182 and/or the velocity stack 186 can be manufactured from carbon fiber, cast aluminum, or the like.

As best shown in FIG. 7, the velocity stack 186 also includes a channel 238 surrounding an interior or curved surface 242 of the velocity stack 186 that receives a rear end 246 of the first filter element 190 (FIG. 9). In particular, the velocity stack 186 is fixedly coupled to the first filter element 190 so that there is no relative movement therebetween. The illustrated interior surface 242 includes an inlet end 250 and an opposing outlet end 254 with the interior surface 242 tapering from the inlet end 250 to the outlet end 254 (e.g., the inlet end 250 is larger than the outlet end 254). The outlet end 254 (FIG. 6) is ellipse-shaped to interface with the inlet opening 146 of the conduit 90. In other words, an interior surface of the ellipse-shaped outlet end 254 mates flush with an interior surface of the ellipse-shaped inlet 110 of the conduit 90 (FIG. 9) so that there are no sharp curves or bends at the interface between the velocity stack 186 and the conduit 90. In the illustrated embodiment, a thickness 258 of the velocity stack 186 between the inlet and outlet ends 250, 254 is about 0.837 inches (FIG. 9). As such, a ratio of the thickness 258 of the velocity stack 186 over the total length 206 of the air filter subassembly 94 is about 0.13.

Figure 8:
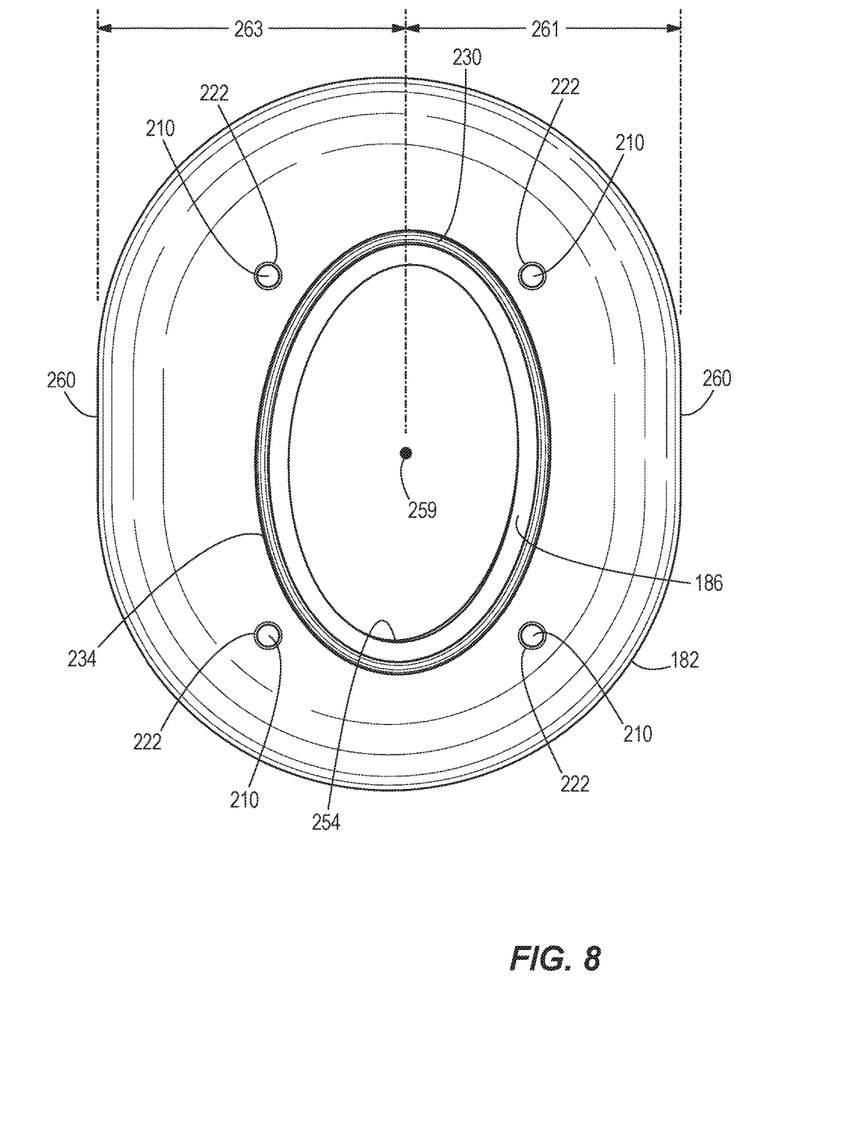
FIG. 8 is an end view of the outlet end of the velocity stack subassembly of FIG. 6.

As best shown in FIG. 8, the outlet end 254 of the velocity stack 186 includes a center point 259 that is offset between opposing lateral sides 260 of the velocity stack 186. In particular, the center point 259 is laterally spaced from the first side 260 of the velocity stack 186 (e.g., the side of the velocity stack 186 facing away from the motorcycle 10) at a first distance 261, and the center point 259 is laterally spaced from the second side 260 of the velocity stack 186 (e.g., the side of the velocity stack 186 facing toward the motorcycle 10) at a second distance 263. In the illustrated embodiment, the first distance 261 is smaller than the second distance 263.

With reference to FIG. 9, the first filter element 190 tapers from the velocity stack 186 to the front end collar 194 with the front end collar 194 coupled to a front end 262 of the first filter element 190 (e.g., the rear end 246 of the first filter element 190 is larger than the front end 262). As described above, the velocity stack 186 is oriented at an oblique angle relative to the vertical and horizontal planes 46, 54; however, the first filter element 190 is oriented at an oblique angle relative to the velocity stack 186 so that the first filter element 190 points in a forward direction of the motorcycle 10, i.e., a direction parallel to the vertical and horizontal planes 46, 54 (FIG. 9). A front end 266 of the second filter element 198 is also coupled to the front end collar 194. In contrast, the second filter element 198 tapers from the front end collar 194 to the impermeable cap 202 so that the second filter element 198 extends into the first filter element 190 toward the velocity stack 186. As a result, the impermeable cap 202 is positioned within the first filter element 190 and is coupled to a rear end 270 of the second filter element 198 (e.g., the front end 266 of the second filter element 198 is larger than the rear end 270). In the illustrated embodiment, a length 274 of the second filter element 198 between the front end collar 194 and the impermeable cap 202 is about 2.63 inches (FIG. 9). As such, a ratio of the length 274 of the second filter element 198 over the total length 206 of the air filter subassembly 94 is about 0.41.

With reference to FIG. 2, once the rider 62 mounts the motorcycle 10 and the rider's foot 278 is positioned on the corresponding footrest 60, the illustrated air intake assembly 82 provides maximum clearance compared to a conventional air intake assembly (a portion of a conventional air intake assembly having a 90 degree bend is illustrated in broken lines within FIG. 9) for the rider's leg 282 (e.g., the rider's knee) so that the air intake assembly 82 does not impede a comfortable riding position of the rider 62 on the motorcycle 10. The ellipse-shaped inlet 110 allows for the outer surface 172 of the conduit 90 to be positioned closer to the engine 66 (e.g., the front cylinder block 74) to provide more room for the rider's leg 282 adjacent the conduit 90 than a conventional air intake assembly. For example, because the apex 178 of the outer surface 172 is positioned at the distance 180 of less than 2.90 inches from the planar outlet flange surface 122 of the outlet 106 (compared to 2.90 inches of a conventional 90 degree bend air intake assembly), the air intake assembly 82 provides more room for the rider's leg 282 and the rider 62 can sit on the motorcycle 10 more comfortably. In addition, because the center point 259 of the velocity stack 186 is offset between opposing lateral sides 260 of the velocity stack 186, the air filter subassembly 90 can be positioned closer to the motorcycle 10 than if the center point 259 was centered between the opposing lateral sides 260, which also increases leg room.

As the motorcycle 10 operates (e.g., the engine 66 is running), ambient air 286 is sucked into the air filter subassembly 94. In particular, the ambient air 286 travels through the first filter element 190 and the second filter element 198 (FIG. 9) to inhibit foreign particles (e.g., dirt and debris) from entering into the air filter subassembly 94. Thereafter, the filtered ambient air 286 passes through the velocity stack 186 to allow for the velocity stack 186 to transform the relatively turbulent ambient air 286 into a smooth and even air flow (e.g., laminar air flow) that enters into the conduit 90. In addition, because the velocity stack 186 mates flush with the conduit 90, the laminar air flow is not disturbed by the interface between the air filter subassembly 94 and the conduit 90. The laminar ambient air 286 then follows a flow path through the conduit 90 that moves substantially parallel to the central axis 166 from the inlet 110 to the outlet 106 before passing through the engine air inlet port 102 of the bracket 86 and entering the engine 66. As described above, no portion of the central axis 166 includes a bend greater than 90 degrees, which impacts (e.g., decreases) a velocity of the airflow 286 traveling through the conduit 90 less than if the airflow 286 travels through the conventional 90 degree bend air intake assembly illustrated in FIG. 9 (e.g., a velocity of the airflow 286 through the conduit 90 is greater than a velocity of the airflow 286 through the conventional air intake assembly). Accordingly, the combination of the velocity stack 186 and the geometry of the conduit 90 provide an increased air flow performance compared to a conventional air intake assembly without impeding a riding position of the rider 62 on the motorcycle 10.

Various features and advantages of the disclosure are set forth in the following claims.

The invention claimed is:

1. An air intake assembly comprising:
   a filter element; and
   an intake conduit including
      a first end forming an inlet opening, the first end supporting the filter element,
      a second end forming an outlet opening and being adapted for attachment to an internal combustion engine, and
      a body defining a central axis extending between the first and second ends;
   wherein a first lateral dimension of the body is taken transverse to the central axis, adjacent the inlet opening, within a plane that intersects both the inlet and outlet openings;
   wherein a second lateral dimension of the body is taken transverse to the central axis, adjacent the outlet opening, within the plane; and
   wherein the first lateral dimension is less than the second lateral dimension.

2. The air intake assembly of claim 1, wherein the body defines a first height transverse to both the plane and the central axis at an axial location of the first lateral dimension, wherein the body further defines a second height transverse to both the plane and the central axis at an axial location of the second lateral dimension, and wherein the first height is greater than the second height.

3. The air intake assembly of claim 2, wherein the central axis defines a curve such that the body includes an outer surface having an apex positioned between the first and second ends within the plane, and wherein a third lateral dimension of the body is taken transverse to the central axis to intersect with the apex, and wherein the third lateral dimension is less than the second lateral dimension.

4. The air intake assembly of claim 3, wherein the body defines a third height transverse to both the plane and the central axis at an axial location of the third lateral dimension, and wherein the third height is greater than the second height.

5. The air intake assembly of claim 1, wherein the central axis defines a curve such that the body includes an outer surface having an apex positioned between the first and second ends within the plane, and wherein a distance between the apex and a planar surface of the second end, transverse to the planar surface, is less than 2.90 inches.

6. The air intake assembly of claim 1, wherein the inlet opening is non-circular, and wherein the outlet opening is circular.

7. The air intake assembly of claim 6, wherein the inlet opening is ellipse-shaped.

8. The air intake assembly of claim 1, wherein the inlet opening defines a first area and the outlet opening defines a second area, and wherein the first area is within 20 percent of the second area.

9. The air intake assembly of claim 1, wherein the filter element is a first filter element of an air filter subassembly that further includes a second filter element, and wherein the second filter element extends into the first filter element.

10. The air intake assembly of claim 9, wherein front ends of the first and second filter elements are coupled to an end collar, and wherein the first filter element tapers from a rear end of the first filter element to the end collar, and wherein the second filter element tapers from the end collar to a rear end of the second filter element.

11. The air intake assembly of claim 1, further comprising a plurality of fasteners extending through the first end of the intake conduit to engage a mount provided at a base of the filter element.

12. An air intake assembly comprising:
   an intake conduit defining a curved flow path; and
   an air filter subassembly having a base end adapted to fit onto the intake conduit, the air filter subassembly including
      a first filter element having a front end and a rear end, and
      a velocity stack coupled to the rear end of the first filter element to inhibit relative movement between the velocity stack and the first filter element, the velocity stack including an interior surface having an inlet opening and an outlet opening, the interior surface tapering from the inlet opening to the outlet opening.

13. The air intake assembly of claim 12, wherein the outlet opening of the velocity stack is non-circular.

14. The air intake assembly of claim 13, wherein the outlet opening is ellipse-shaped.

15. The air intake assembly of claim 13, wherein the air filter subassembly includes a groove surrounding the outlet opening of the velocity stack, and wherein a gasket is positioned in the groove.

16. The air intake assembly of claim 12, wherein a surface of the outlet opening is configured to mate flush with a surface of the intake conduit forming an inlet opening of the flow path.

17. The air intake assembly of claim 12, wherein the first filter element is coupled between the velocity stack and an end collar of the air filter subassembly, and wherein the air filter subassembly includes a second filter element coupled to the end collar, and wherein the second filter element extends into the first filter element.

18. The air intake assembly of claim 17, wherein the air filter subassembly includes an air-impermeable cap coupled to a rear end of the second filter element, wherein the first filter element tapers from the velocity stack to the end collar, and wherein the second filter element tapers from the end collar to the air-impermeable cap.

19. The air intake assembly of claim 12, wherein a portion of the air filter subassembly forms a mount including a plurality of threaded holes, and wherein the plurality of threaded holes are configured to receive a plurality of fasteners to couple the air filter subassembly to an intake conduit.

20. The air intake assembly of claim 12, wherein the intake conduit includes a first end forming an inlet opening and a second end forming an outlet opening, and wherein the inlet opening of the intake conduit is non-circular, and wherein the outlet opening of the intake conduit is circular.

* * * * *